United States Patent Office 3,732,110
Patented May 8, 1973

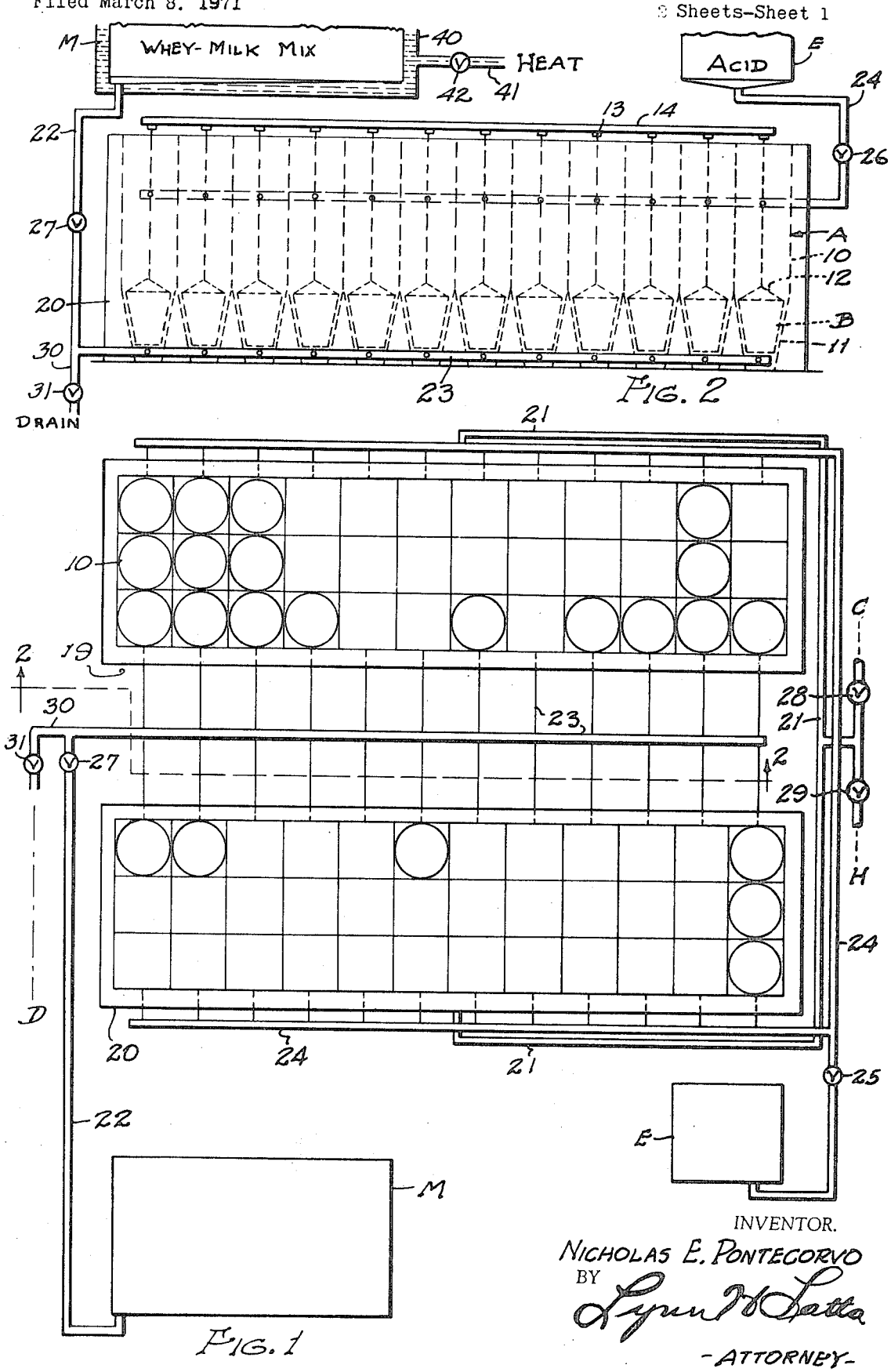

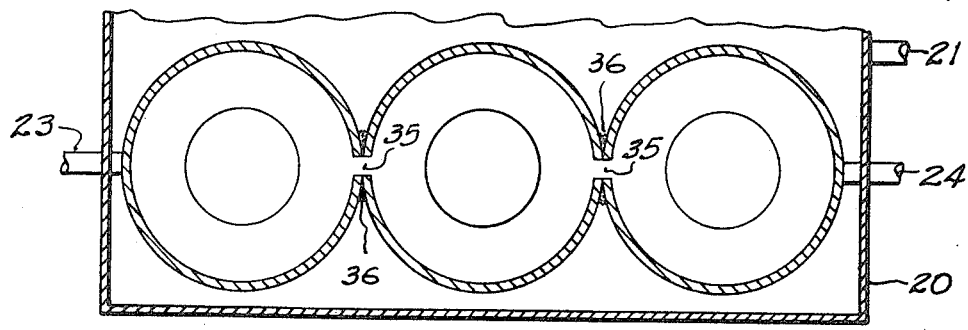
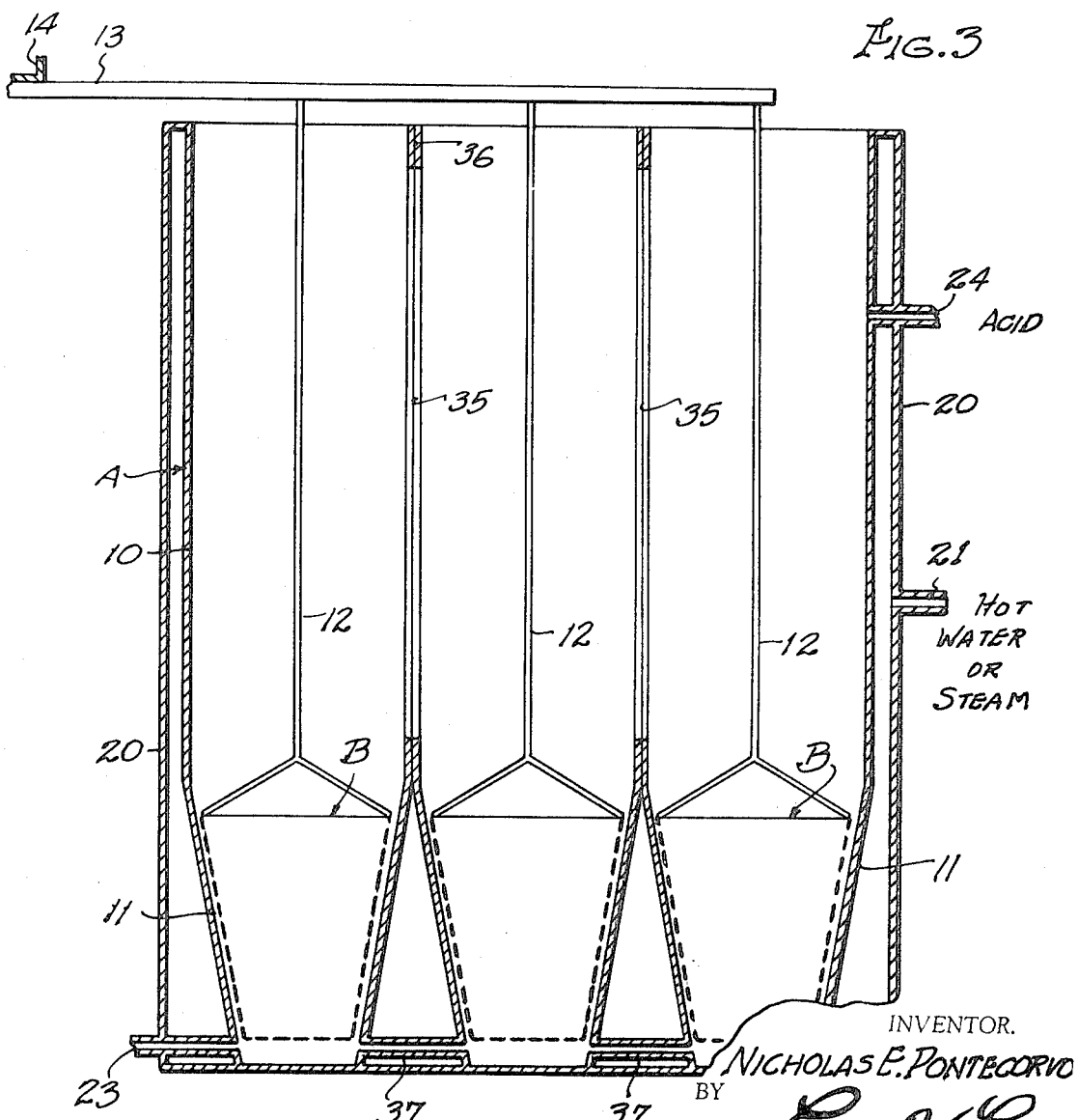

3,732,110
PROCESS FOR PRODUCING RICOTTA CHEESE
Nicholas E. Pontecorvo, Tarzana, Calif., assignor to Pontecorvo R & D Company, Los Angeles, Calif.
Continuation-in-part of application Ser. No. 39,721, May 22, 1970. This application Mar. 8, 1971, Ser. No. 121,709
Int. Cl. A23c *19/02*
U.S. Cl. 99—116                                  13 Claims

ABSTRACT OF THE DISCLOSURE

A heated mixture of whey and milk is processed simultaneously in a plurality of small adjacent cells by successive acidifying steps, to develop separate floating bodies of curd which are then collected in respective skimming baskets as residual whey is drained off below them, and are finally removed by simultaneously lifting the skimming baskets from the cells.

---

This application is a continuation-in-part of my pending application Ser. No. 39,721 filed May 22, 1970, for Method and Apparatus for Processing Ricotta Cheese.

BACKGROUND OF THE INVENTION

Ricotta cheese, a product of new milk added to the whey residue from the processing of cheese of other types, is customarily processed in vats of large diameter and volume, by steeping the mixture of whey and milk at an elevated temperature (hereinafter referred to as "cooking") then charging the mixture with acid (e.g. vinegar) to curdle the mixture into a suspension of finely divided curd particles in a suspending body of whey, and allowing the fixture to stand while the curd particles rise to the surface, where the curd is skimmed off by hand ladling into a suitable receptacle. The Ricotta curd is very delicate and will readily disintegrate and re-mix with the residual whey body if subjected to shock from rough handling during ladling. Also, in hand-skimming from a large vat, it is difficult to capture the remaining vestiges of curd after the bulk of the floating curd body has been ladled off. As a result of these factors, considerable proportion of the curd is lost from each batch. A related problem arises from the time consumed in the hand-skimming operation. During the skimming operation, the curd remaining in the vat is subjected to the continued cooking action of the underlying body of whey (the temperature of which remains elevated subject only to a slow gradual heat loss) and due to the continued cooking in the presence of the acid, the character and texture of this remaining curd is gradually altered, so that the total content of skimmed-off curd is a mixture of curd portions of varying texture and quality. Thus the aggregate quality of the batch of recovered Ricotta cheese is dependent upon the time consumption and nature of handling of the curd by the workman during the skimming operation. This is not conductive to accurate control or uniformity of product.

I have heretofore attempted to improve upon such conventional process by draining off the residual whey from a single processing vat of suitable size for producing a batch of Ricotta cheese of normal volume, and catching the floating curd in a foraminous basket through which the whey is drained. These elements of improvement are retained in the present invention and are a part thereof. However, I have found that a further problem arises from the weight of the volume of curd building up in a collecting basket of sufficiently large volume to retain all of the curd from a batch of process mixture of normal size. The extremely delicate texture of the Ricotta curd is such that the mere weight of the collected curd body tends to break down and deteriorate the texture of the curd in the lower level of the collected body, and some of it tends to become intimately mixed with the residual whey draining through the basket, in such a finely divided state as to be carried through the bottom of the basket along with the whey and thus lost without any feasible possibility of being reclaimed by further processing.

RESUME OF THE INVENTION

The present invention avoids the above described difficulties by simultaneously processing a plurality of small volumes of whey-milk mix, collectively equal to a normal batch, in separate processing cells in the form of vertically standing tubes of small diameter, in a series of steps comprising, in general, preparing the mix by adding milk to whey (e.g. in a proportion of 1 part milk to 2 parts whey); steeping it at elevated temperature (cooking); injecting the mix into the battery of cells; acidifying the mix to develop a colloidal suspension of curd in a residual whey body; chilling the suspension to arrest the cooking action; allowing the suspension to stand at reduced temperature sufficiently long for most of the curd to rise to the surface; draining the residual whey downwardly through respective strainer baskets (in which the curd is collected and retained) at a rate sufficiently slow to allow the fine curd particles to settle in the baskets without being pulled through them; and finally elevating the baskets and emptying their contents into a receptacle or onto receiving surfaces. All of these steps are performed simultaneously in the several cells so as to develop a uniform aggregate product. The bodies of collected curd are sufficiently small in volume to avoid any weight-induced deterioration of the curd. The sudden cooling (a new step) provides efficient control over curd development, by arresting the cooking operation to enable a processor to attain a uniform product from a selected schedule of processing factors. Arrest of cooking also makes it possible to utilize time control in the slow draining of the whey from the curd. By utilizing small diameter cells in a fairly large number, it becomes possible to effect charging, acidification, chilling, and draining much more rapidly than would be possible in a single large vat having a volume equivalent to the aggregate volume of the plurality of small cells. The injection of mix and the application of steam or hot water for heating, and of cold water for chilling, is effected through common manifolds communicating with all of the cells. The baskets are manipulated in unison, preferably being tied together for that purpose.

OBJECTS OF THE INVENTION

Consonant with the foregoing, the invention has as its general object to provide a process for producing Ricotta cheese with a maximum recovery of curd from the processed mixture, with maximum predictable uniformity of the resultant product, with minimum dependency on the skill of the operator, and with maximum rapidity.

Specific objects are:

(1) to eliminate the necessity for hand ladling from a processing vat;

(2) to minimize deterioration of the curd once it is developed;

(3) to attain maximum rapidity in the processing steps, consistent with control of quality and volume of recovered curd;

(4) to achieve time control in the separation of residual whey from the curd in a manner to avoid loss of curd and to preserve the quality of the curd;

(5) to arrest cooking at the point of curd development so as to avoid deterioration through continued cooking;

(6) to attain more thorough acidification through more rapid dispersion of the vinegar in the whey, minimizing agitation and avoiding curd loss through fines; and (7) to provde an apparatus that can be efficiently utilized to attain these improvements in process.

DESCRIPTION—THE APPARATUS

These and other objects will become apparent in the ensuing description and appended drawings, wherein:

FIG. 1 is a schematic plan view of an apparatus that can be utilized in the practice of the process of the invention;

FIG. 2 is a schematic side elevational view of the same viewed as indicated by line 2—2 of FIG. 1;

FIG. 3 is a vertical sectional view of one of the processing cells and related structure; and FIG. 4 is a horizontal sectional view on line 4—4 of FIG. 3, omitting a showing of the strainer baskets.

Referring now to the drawings in detail, the apparatus shown therein comprises, in general, a plurality of cells A each embodying a tubular body 10 and having at its lower end a downwardly tapered frusto-conical collecting chamber 11. In each chamber 11 is a curd-collecting strainer basket B of foraminous structure (e.g. perforated sheet material) which is loosely fitted within chamber 11. Each basket is carried by a hardness 12 suspended from an overhead support arm 13 which in turn can be carried by a support 14 common to the collecting baskets of the entire system of cells A, so that the baskets can be lowered and lifted in unison. The cells A are arranged in a plurality of rows which may advantageously be grouped in two batteries of two, three or four rows each, three being shown and providing a satisfactory arrangement.

The cells A have an aggregate cross-sectional area such as to be equivalent, functionally to that of the single large vat commonly in use in present practice. For example, the cells may have a diameter of 10 inches each and arranged in two batteries of 36 cells each, making a total of 72 cells with an aggregate area of roughly 40 square feet, as compared to the surface area of about 41 square feet in a body of whey in a vat of 7 feet diameter. The two batteries can each be arranged in three longitudinal rows of twelve cells each, all enclosed in a rectangular temperature-control jacket 20 about 45″ wide by 16′ or 17′ long. The two batteries are shown in FIG. 1, separated laterally by a longitudinally space 19 which can be utilized for access by an attendant.

Steam or hot water can be injected into each jacket 20 from a supply line H through a manifold 21 common to both jackets (as may be most convenient in a given installation). For the chilling operation, the same manifold can be filled with cold water delivered from a supply line C.

Whey-milk mix, contained initially in a tank M, can be injected into the several cells through supply line 22 and a manifold 23, common to both batteries of cells A. Similarly, the contents of the several cells can be simultaneously acidified by injection of vinegar or other suitable acid from an acid tank E through a common manifold 24. Optionally, tank E can be connected through a valve controlled supply line 24 to the manifold 23 so as to provide for injecting acid, through the same path as mix-injection, into the bottoms of cells A. Manifold 24 is controlled by a valve 25. Supply lines 22, C and H are controlled by valves 27, 28 and 29 respectively.

Whey is drained from the cells through an outlet 30 communicating with the bottom of collecting chamber 11 and controlled by a valve 31 which is of a metering type such that the rate of outflow can be regulated.

Referring to FIGS. 3 and 4, the cells A of each group of three are in open communication with one another through vertical slots 35 in areas of tangent adjoining relation, and are secured together by suitable attachment means such as lines of welding 36 bordering and extending completely around the slots 35. In addition, the lower ends of collecting chambers 11 are interconnected by ducts 37 which may be aligned with the respective connections to manifold 23 for maximum efficiency of filling and draining operations.

Manifold 23, being at the bottom level of collecting chambers 11, will fully drain the whey from the respective cells during the draining operation, to a level at the bottoms of baskets B or below. When a batch of mix is injected into the cells, it will rise through the baskets B into the cell bodies 10 to a selected level which determines the quantity of curd developed in a given operation. Thus the quantity of the product can be effectively and expeditiously regulated by varying the quantity of mix injected into the cells. Baskets B are tapered to match the lateral wall taper of conventional cheese cartons, and the apparatus can be operated so as to produce, in each batch, a plurality of cheese bodies of proper shape and volume to just fill and fit into cartons of 5 pound capacity, or of any other capacity up to 8 or 10 pounds. By emptying the tapered cheese bodies in inverted positions on a horizontal surface or surfaces (e.g. a series of pedestals having flat circular platforms the same diameter as the major diameter of a cheese body) then placing respective cartons in inverted positions over the respective cheese bodies, and then, inverting the platforms, with the cheese bodies held snugly in place, the cheese bodies will be re-inverted to upright positions resting in their cartons ready to be capped.

Suitable means is provided for preheating the mix in tank M and maintaining it at a suitable temperature (e.g. in the range of 140° to 205° F.) at which it will promptly undergo curd formation when acidified. Preferably, tank M is provided with a heating jacket 40 which may be supplied with steam or hot water through a supply line 41 and valve 42.

Suitable drain connections (not shown) are provided for jackets 20 and 40, so that heating fluid can be flushed out and so that hot water in jacket 20 can be replaced by cold water for chilling.

OPERATION—THE METHOD

The method is primarily characterized by utilizing a large number of fairly small diameter processing cells in which a heated mix is acidified to develop a suspension of curd particles in a body of whey which is drained downwardly through respective collecting baskets, the whey being strained out and the curd retained in the baskets. In detail, the method in its preferred form, embodies the following steps:

(1) Whey residue from another cheese-making process, along with a selected proportion of new milk, is placed in the vat M. For some Ricotta cheeses, the mix may be 100% whey. Other cheeses can be processed by this method, utilizing only new milk. The higher the content of whey, the more delicate is the resulting curd, and the more important the use of the present method. The mix is preheated, either before entering the vat M, or is (preferably) heated in the vat M after selected quantities of whey and milk are injected into the vat. The mix, after being elevated to the selected processing temperature, is maintained at that temperature by regulating the temperature of the heating fluid in jacket 40.

(2) When a curd-forming cycle is to commence, valve 27 is opened and the mix is flowed, by gravity or by pumping, into the batteries of cells A, through manifold 23. When the cells are filled to the selected height for the cheese quantities to be formed, the valve 27 is closed.

(3) Normally, the acidifying step will be immediately performed by opening valve 25 and releasing a predetermined volume of acid, determined by any suitable metering device (not shown) and flowing it through manifold 24, by gravity or by pumping, into the several bodies of mix in the cells, to produce a suspension of fine curd particles in suspending whey bodies.

The acid, in effect, is "dumped" into the mix, avoiding stirring which would tend to break down the curd into finely divided particles (fines) and/or inhibit its formation.

(4) Heat, as needed, is applied in cell jackets 20 by opening valve 29, to improve curd separation and flotation.

(5) The suspension is allowed to stand in the cells for a short period of time (e.g. 1–5 minutes) to allow the separation and flotation to develop to a satisfactory degree of completion.

(6) In most cases, cold water is then injected into jacket 20 by closing valve 29 and opening valve 28 (and a suitable drain connection). This will be effective to promptly inhibit further cooking of the suspensions and to stabilize the curd at a desired level of tenderness and quality.

In some operations, where there are adequate facilities for draining away the waste whey residue, chilling may be effected by injecting cold water directly into the mix following acidifying. This can be accomplished by injecting through manifold 23, using a suitable valved connection (not shown) from cold water line C to the manifold.

(7) Valve 31 is then opened and regulated to effect slow draining of the suspending whey body, allowing the floating curd to settle down into the baskets B at a rate sufficiently gradual to avoid pulling the finer curd particles through the basket openings along with the draining whey. For an 8 pound cheese, the draining may be prolonged for a period of about 8 minutes. For a 5 pound cheese, it may be completed in about 5 minutes.

(8) When all the whey is drained off, the baskets of the two cell batteries are elevated (e.g. by using a suitable overhead crane) and transferred to an unloading station where their cheese body contents may be transferred to cartons as outlined above.

(9) The apparatus is then spray-washed and a new cycle is initiated by injecting preheated mix from tank M into the cells A.

I claim:

1. A method of processing Ricotta cheese from a curd-forming liquid body, comprising the following steps:
    containing said liquid body in a plurality of tubular acidifying cells, each of small volume in proportion to their aggregate volume, at an elevated temperature at which curd will be developed by acid treatment;
    injecting acid into the liquid bodies in the several cells to develop curd particles and whey;
    draining said whey from said cells while straining out said curd particles;
    allowing the curd particles to settle in strainer baskets at the bottoms of the cells and collecting the curd particles in said baskets in the form of curd bodies;
    removing said baskets from said cells;
    and removing the curd bodies from the baskets.

2. The method defined in claim 1, using a mix of whey residue from another cheese process, along with new milk, as the curd-forming body.

3. The method defined in claim 2, wherein said whey residue and milk are mixed and preheated in a separate vat and transferred into the acidifying cells at the beginning of a curd-forming cycle.

4. The method defined in claim 1, wherein the acid is injected into the cell contents without stirring, to minimize the formation of fines and inhibition of curd formation by agitation.

5. The method defined in claim 1, wherein said baskets are contained within the cells during curd development, and are removed upwardly through the upper ends of the cells after draining of the whey.

6. The method defined in claim 5, including the step of allowing the curd particles to float to the surface of said liquid body while regulating the temperature of the cells by injection of heated liquid into jacket spaces around the cells, to improve curd separation and flotation.

7. The method defined in claim 1, including the step of allowing the cell contents to stand for a short period of time in the range of 1–5 minutes after acidification, to attain an optimum degree of completion of curd separation and flotation.

8. The method defined in claim 1, including the step of chilling the cell contents following acidification, to inhibit further cooking and to stabilize the curd at a desired level of tenderness and quality.

9. The method defined in claim 1, wherein acid injection and draining steps are performed simultaneously in all cells.

10. The method defined in claim 1, wherein said cells are in lateral communication with one another so that the individual liquid bodies therein are joined and at a common level.

11. A method of processing Ricotta cheese from a curd forming liquid body which is subjected to the action of heat and acid to develop Ricotta curd particles and whey, comprising the following steps:
    containing said liquid body, during said development of curd particles and whey, in a battery of closely adjacent tubular acidifying cells, each of small volume in proportion to their aggregate volume;
    following the development of said curd particles and whey, draining said whey downwardly through strainer baskets at the lower extremities of the liquid bodies in the cells, and collecting respective bodies of said curd particles in said baskets;
    removing said baskets with their contained curd bodies from said cells;
    and removing said curd bodies from the baskets.

12. The method defined in claim 11, wherein the draining is regulated at a slow rate such as to minimize loss of curd fines through the strainer baskets as the result of the dragging action of the straining whey.

13. The method defined in claim 12, wherein draining is effected by gravity.

References Cited

UNITED STATES PATENTS

| 3,019,527 | 2/1962 | McReary | 31—46 X |
| 3,032,877 | 5/1962 | Collins | 31—46 |
| 3,528,821 | 9/1970 | Stenne | 99—116 |

OTHER REFERENCES

Kosikowski, F.: Cheese and Fermented Milk Foods, published by the author, Cornell University, N.Y. (1966), pp. 168–173.

A. LOUIS MONOCELL, Primary Examiner

D. M. NAFF, Assistant Examiner

U.S. Cl. X.R.

31—46, 89